US009209935B2

(12) United States Patent
Dhayni et al.

(10) Patent No.: US 9,209,935 B2
(45) Date of Patent: Dec. 8, 2015

(54) LOW COMPLEXITY MAXIMUM-LIKELIHOOD-BASED METHOD FOR ESTIMATING EMITTED SYMBOLS IN A SM-MIMO RECEIVER

(71) Applicant: STMicroelectronics International N.V., Amsterdam (NL)

(72) Inventors: Achraf Dhayni, Vallauris (FR); Hussein Hijazi, Beirut (LB)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 14/337,406

(22) Filed: Jul. 22, 2014

(65) Prior Publication Data

US 2015/0030107 A1   Jan. 29, 2015

(30) Foreign Application Priority Data

Jul. 23, 2013   (EP) .................................... 13306054

(51) Int. Cl.
*H04B 7/04* (2006.01)
*H04L 1/06* (2006.01)
*H04L 1/00* (2006.01)
*H04L 25/03* (2006.01)

(52) U.S. Cl.
CPC ............ *H04L 1/0054* (2013.01); *H04B 7/0413* (2013.01); *H04L 1/0631* (2013.01); *H04L 25/03197* (2013.01); *H04L 25/03242* (2013.01); *H04L 25/03961* (2013.01); *H04L 2025/0342* (2013.01); *H04L 2025/03414* (2013.01); *H04L 2025/03426* (2013.01)

(58) Field of Classification Search
CPC ...... H04B 7/0413; H04B 7/08; H04L 1/0054; H04L 1/0631; H04L 27/38; H04L 25/03242; H04L 25/0246

USPC .......................................................... 375/267
See application file for complete search history.

(56) References Cited

U.S. PATENT DOCUMENTS

| 8,116,410 B1 | 2/2012 | Jia et al. | |
|---|---|---|---|
| 2003/0007552 A1 | 1/2003 | Krupka | |
| 2009/0185631 A1* | 7/2009 | Choi et al. | 375/260 |
| 2009/0316803 A1* | 12/2009 | Paker et al. | 375/260 |

FOREIGN PATENT DOCUMENTS

WO   WO-2013080086 A1   6/2013

OTHER PUBLICATIONS

EPO Search Report and Written Opinion for EP 13306054 mailed Feb. 5, 2014 (8 pages).
Artes H et al, "Efficient Detection Algorithms for MIMO Channels: A Geometrical Approach to Approximate ML Detection", IEEE Transactions on Signal Processing, IEEE Service Center New York vol. 51 No. 11—Nov. 1, 2003 pp. 2808-2820.
Wei Peng et al, "Improved QRM-ML Detection With Candidate Selection for MIMO Multiplexing Systems", TENCON 2007—IEEE Region 10 Conference IEEE PI, Oct. 30, 2007 pp. 1-4.

\* cited by examiner

*Primary Examiner* — Betsy Deppe

(74) *Attorney, Agent, or Firm* — Gardere Wynne Sewell LLP

(57) ABSTRACT

A receiver estimates a vector of emitted symbols over a MIMO transmission channel which are emitted by a emitting antennas. The receiver receives a vector of received symbols on receiving antennas. Estimation of the vector of emitted symbols is made by calculating a metric associated with a criterion for each vector of a subset of all possible vectors of emitted symbols and selecting an estimation for said vector of emitted symbol as the vector of emitted symbols among said subset which minimizes said metric.

8 Claims, 7 Drawing Sheets

LOW COMPLEXITY MAXIMUM-LIKELIHOOD-BASED METHOD FOR ESTIMATING EMITTED SYMBOLS IN A SM-MIMO RECEIVER

PRIORITY CLAIM

This application claims priority from European Application for Patent No. 13306054.1 filed Jul. 23, 2013, the disclosure of which is incorporated by reference.

TECHNICAL FIELD

The invention relates to telecommunication systems, and more particularly to signal decoding by a receiver in multiple-input-multiple-output (MIMO) systems.

BACKGROUND

Multiple-input-multiple-output (MIMO) systems are a telecommunication architecture where both the emitter and the receiver have several antennas, in order to improve communication performances. Different possibilities exist to make use of such architecture, including antenna diversity and spatial multiplexing.

Multiple-input-multiple-output (MIMO) systems using spatial multiplexing (SM) allows reaching higher performances (i.e. bitrate) than MIMO systems using diversity technique. However, the receiver's task of decoding the received signal is very complex.

In general, the receiver decodes the received signal by looking for a best estimate thanks to maximum likelihood (ML) detection methods. This task is very problematic for the receiver as the number of antennas increases due to the huge number of possible multiplexing combinations.

Some solutions known in the art which make use of ML criteria are based on QR decomposition technique. QR decomposition consists in transforming a matrix A into a product A=Q·R where Q is an orthogonal matrix and R is an upper triangular matrix.

Among the solutions based on ML decoding, one can mention sphere decoding and QRM-MLD.

The sphere decoding method is a search algorithm consisting in exploring all the lattice points inside a hypersphere centered at the received symbol vector. One of the most efficient known sphere decoding algorithms has been proposed in the article "A universal lattice code decoder for fading channels" by Emmanuel Viterbo and Joseph Boutros, in IEEE Transactions on Information Theory, vol. 45, no. 5, July 1999, the disclosure of which is incorporated by reference.

Sphere decoding allows decreasing the complexity, but it still suffers of major drawbacks: for instance, the algorithm is very dependent on the initial value for the search radius: if the search radius is chosen too small, there may be no solution in the hypersphere, but if the search radius is chose too large, the number of points to explore may become too large and the algorithm will encounter the same issue as ML-based detection algorithms.

Furthermore, the algorithm cannot be parallelized on a hardware platform, preventing it to be efficiently used in a real-time high data rate context. Also, its complexity is very dependent on the signal-to-noise ratio (SNR) and on the channel modeling parameters used for implementing the algorithm.

Another set of solutions known in the art are based on the so-called "QRM-MLD" techniques, i.e. QR Decomposition with order M Maximum Likelihood Decoding". Such a method has for example been described in the article "Joint Data Detection and Channel Estimation of OFDM Systems" by Tao Cui and Chintha Tellambura, in IEEE Transactions on communications, vol. 54n no. 4, April 2006, the disclosure of which is incorporated by reference, or in the article "Likelihood function for QRM-MLD suitable for soft-decision turbo decoding and its performance for OFCDM MIMO multiplexing in multipath fading channel", by H. Kawai, K. Higuichi, N. Maeda et al., in IEICE Transactions on Communications, E88-B (1), 47-57, the disclosure of which is incorporated by reference.

Compared with Sphere Decoding, QRM-MLD techniques, which only keeps the best M candidates for the next level search, has fixed throughput and is suitable for pipelined hardware implementation. In terms of result accuracy, it achieves comparable performance with ML-based detection algorithms.

However, it involves a very high complexity, especially for higher modulation schemes like 256 QAM (Quadrature Amplitude Modulation). Also, like the Sphere Decoding solution, this algorithm cannot be implemented on highly parallel hardware architecture and is thus not suitable for real-time high data rate transmission.

SUMMARY

There is a need to alleviate at least partly the above mentioned drawbacks.

More particularly, an embodiment aims to reduce the complexity of the decoding of the received signals, while keeping the same performances than maximum likelihood-based detection algorithms. In addition, the proposed solution aims to be deployed on highly parallel hardware architecture and thus to be applicable to real-time high data-rate decoding algorithms. It can therefore be used within OFDM receivers.

This is achieved with a method for estimating a vector of emitted symbols over a MIMO transmission channel emitted by a first plurality of emitting antennas, by receiving a vector of received symbols on a second plurality of receiving antennas, said method comprising estimating said vector of emitted symbols by calculating a metric associated with a criterion for each vector of a subset of all possible vectors of emitted symbols and by selecting an estimation for said vector of emitted symbol as the vector of emitted symbols among said subset which minimizes said metric.

Preferred embodiments comprise one or more of the following features:
  said metric is an Euclidian distance $\|y-H\cdot x\|^2$ associated with a criterion $y-H\cdot x$, wherein y represents said vector of received symbols, x represents said each vector, and H represents a transfer function matrix for said transmission channel;
  said estimating comprises performing a QR decomposition of said criterion;
  said subset is determined by defining intervals for each symbols of the vector of emitted symbols, said intervals being provided by a sphere decoding process;
  said sphere decoding is performed by replacing the error terms by a predetermined factor;
  said subset is determined by replacing some of said symbols of said vector of emitted symbols by approximations. S
  said approximation involves a slicing operation;
  said symbols are modulated by a QAM 16 modulation scheme.

Another aspect concerns a computer program comprising program instructions and being loadable into a data processing unit and adapted to cause execution of the method according to the process when the computer program is run by the data processing unit.

Another aspect concerns a receiver adapted for estimating a vector of emitted symbols over a MIMO transmission channel emitted by a first plurality of emitting antennas, by receiving a vector of received symbols on a second plurality of receiving antennas, said receiver being adapted for estimating said vector of emitted symbols by calculating a metric associated with a criterion for each vector of a subset of all possible vectors of emitted symbols and by selecting an estimation for said vector of emitted symbol as the vector of emitted symbols among said subset which minimizes said metric.

Preferred embodiments comprise one or more of the following features:
  said metric is an Euclidian distance $\|y-H\cdot x\|^2$ associated with a criterion $y-H\cdot x$, wherein y represents said vector of received symbols, x represents said each vector, and H represents a transfer function matrix for said transmission channel;
  said estimating comprises performing a QR decomposition of said criterion.
  the receiver is adapted to determine said subset by defining intervals for each symbols of the vector of emitted symbols, said intervals being provided by a sphere decoding process;
  the receiver is adapted to perform said sphere decoding by replacing the error terms by a predetermined factor;
  the receiver is adapted to determine said subset by replacing some of said symbols of said vector of emitted symbols by approximations.

BRIEF DESCRIPTION OF THE DRAWINGS

Further features and advantages will appear from the following description of embodiments of the invention, given as non-limiting examples, with reference to the accompanying drawings listed hereunder, wherein.

DETAILED DESCRIPTION OF THE DRAWINGS

Figure 1:
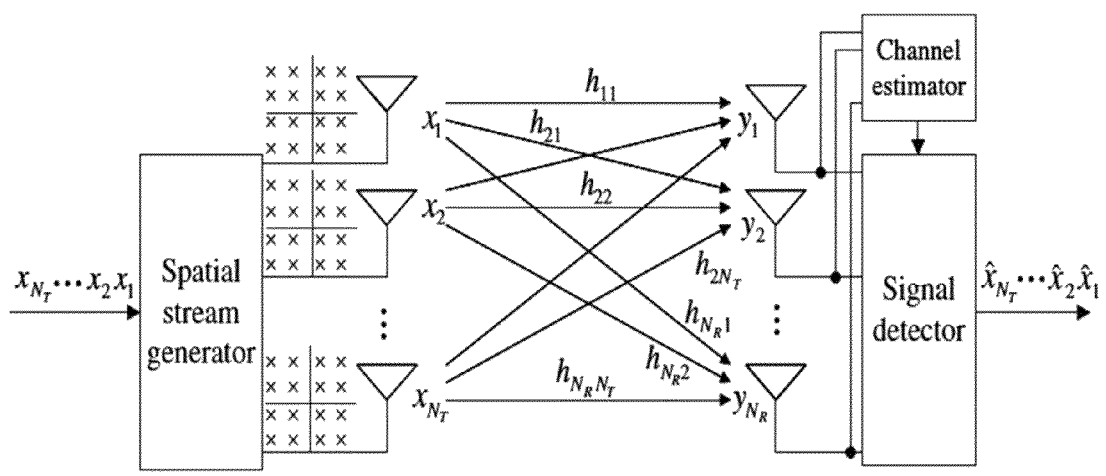
FIG. 1 shows a high-level architecture of a spatially-multiplexed MIMO system.

FIG. 1 depicts a MIMO system using spatial multiplexing.
Such a system can be implemented for OFDM communication systems. Orthogonal Frequency-Division Multiplexing (OFDM), also referred to as "multi-carrier modulation" (MCM) or "discrete multi-tone modulation" (DMTM), splits up and encodes high-speed incoming serial data, modulating it over a plurality of different carrier frequencies (called "sub-carriers") within a communication channel to transmit the data from one user to another. The serial information is broken up into a plurality of sub-signals that are transmitted simultaneously over the subcarriers in parallel.

By spacing the subcarrier frequencies at intervals of the frequency of the symbols to transmit, the peak power of each modulated subcarrier lines up exactly with zero power components of the other modulated subcarriers, thereby providing orthogonality (independence and separability of the individual subcarriers). This allows a good spectral efficiency (close to optimal) and minima inter-channel interference (ICI), i.e. interferences between the subcarriers.

For this reason, OFDM is used in many applications. Many digital transmission systems have adopted OFDM as the modulation technique such as digital broadcasting terrestrial TV (DVB-T), digital audio broadcasting (DAB), terrestrial integrated services digital broadcasting ISDB-T), digital subscriber line (xDSL), WLAN systems, e.g. based on the IEEE 802.11 a/g standards, Cable TV systems, etc.

OFDM systems based on MIMO communication scheme are often referred to as "MIMO-OFDM" and are used to increase the transmission bit-rate. Embodiments herein are however applicable to other implementations of the MIMO principles.

In FIG. 1, only the elements related to the MIMO systems and useful for the understanding of the invention are depicted. This schema shows an emitter EMT and a receiver RCM communicating through a communication channel TC, through an array of $N_T$ emitting antennas and $N_R$ receiving antennas.

In MIMO systems, each emitting antennas can emit a symbol, respectively $x_1, x_2, x_3 \ldots x_{NT}$ to potentially all the $N_R$ receiving antennas. The symbols are demultiplexed by the spatial stream generator SSG. The symbols $x_1, x_2, x_3 \ldots x_{NT}$ are received as a serial stream by the spatial stream generator SSG, which then generates $N_T$ signals sent in parallel by the $N_T$ emitting antennas.

The received symbols respectively $y_1, y_2, y_3 \ldots y_{NR}$ are therefore a combination of the symbols emitted by the emitting antennas.

Between an emitting antenna i and a receiving antenna j, the transmission channel TC can be modeled by a transfer function $h_{ij}$. There are therefore $N_R \times N_T$ sub channels and transfer functions $h_{ij}$.

The values of the emitted and received symbols, $x_i$, $y_j$ respectively, and of the transfer functions $h_{ij}$ are complex values.

The emitted symbols may comply with different modulation schemes. An example of such a modulation scheme is the QAM scheme (Quadrature Amplitude Modulation).

The QAM scheme comprises transmitting a signal by two amplitude modulated carriers. The carriers are usually sinusoids and phased by 90° to each other, i.e. in quadrature.

Some common implementations of the QAM scheme transmit quantified values on both carriers. The different possible values are then often represented as a "constellation" as depicted in the FIG. 2. The constellation of this example relates to a 16-QAM scheme, i.e. wherein the modulated signal can take one among 16 possible values.

The signal is represented as a complex value; typically the horizontal axis represents the real axis and the vertical axis represents the imaginary axis. The 16 possible values form an alphabet of the signal and are depicted as dots together with the value in bits (coded on 4 bits).

Accordingly, each of the emitted symbols $x_i$ takes values among the 16 possible complex values of the alphabet of the constellation.

From the explanation given above, it is possible to express the received symbols by the equation:

$$y = H \cdot x + z$$

wherein x and y represent respectively the vector of the emitted and received symbols, so that: $x=[x_1, x_2, x_3 \ldots x_{NT}]^T$ and $y=[y_1, y_2, y_3 \ldots y_{NR}]^T$, H represents the transfer function matrix for the transmission channel TC and z represents the noise over this channel.

The noise z is usually a white Gaussian noise with a variance of $\sigma_z^2$. This noise differs according to the subchannels. The noise z is then expressed as a vector of $N_R$ values: $z=[z_1, z_2, z_3 \ldots z_{NR}]^T$.

The matrix H is formed with the transfer function $h_{ij}$ of each sub-channels. Accordingly, the matrix H is a $N_R \times N_T$ matrix.

We can also note $h_i$ the $i^{th}$ column vector of the matrix H. Therefore, the previous equation can also be written as:

$$y = h_1 x_1 + h_2 x_2 + h_3 x_3 + \ldots + h_{NT} x_{NT} + z$$

The problem to be solved then by the receiver is to detect the emitted symbols x, i.e. to determine the emitted symbols x, knowing the received symbols y and the transfer functions being estimated.

A typical technique for doing this is to use a Maximum Likelihood (ML) detection method based on a criterion to be minimized. This criterion can be associated to a metric. This metric is typically an Euclidian distance.

According to an embodiment, then using a maximum likelihood-based method consists in calculating the Euclidian distance $\|y - H \cdot x\|^2$ of the criteria $y - H \cdot x$, i.e. the Euclidian distance between the received signal vector and the product of possible emitted vectors with the estimated transfer function H for the transmission channel.

In general, we note $C^{NT}$ the set of all these possible emitted symbols vectors (which depends on the number $N_T$ of emitting antennas). Each symbol of the vector belongs to the alphabet of the constellation, as depicted in the example of the FIG. 2.

Then, the problem to be solved is to calculate the Euclidian distance $\|y - H \cdot x\|^2$ and to determine an estimation $\hat{x}_{ML}$ of the most probable emitted signal vector x, i.e. the one which minimizes this Euclidian distance. This can be written as:

$$\hat{x}_{ML} = \arg\min_{x \in C^{NT}} \|y - H \cdot x\|^2$$

It is known in the art that the maximum likelihood method achieves the optimal performance as the maximum a posteriori (MAP) detection, when all the emitted symbols vectors are equally likely.

However, its complexity increases exponentially according to the modulation order (i.e. the size of the constellation associated with the modulation scheme) and the number of emitting antennas.

For instance an exhaustive search over the set of possible solutions for a 64-QAM communication system having $N_R$ receiving antennas consists in considering $64^{NR}$ possibilities. Even with only 2 receiving antennas, this implies already 4096 possibilities.

Consequently, this method cannot be used in real-life implementation, but it serves as a basis to which other methods are compared, since its represents the best possible performance.

Only a subset of all possible vectors of emitted symbols is considered for calculating the metric and for selecting an estimate for the emitted vectors of symbols.

Accordingly, the complexity of the maximum likelihood-based methods is decreased and these methods are usable within the context of real-time systems, like, for instance OFDM transmission systems, for decoding high-order modulated signals (e.g. 16-QAM and above).

In order to reduce the number of considered possible vectors to a subset of all the possibilities, several methods can be used.

According to a first implementation, the subset is determined by defining intervals for each symbol of the vector of emitted symbols. The number of possible emitted vector of symbols is then limited, symbols by symbols: the excursion of each symbol is limited within the interval, so that a subset of all possible vectors of emitted symbols is defined.

The intervals are provided by a sphere decoding process.

Accordingly, a QR decomposition of a real channel matrix associated with the transfer function matrix is performed.

First, the complex equation $y = H \cdot x + z$ is converted into a real system, by decomposing each complex term y, x and z as the sum of its real part and of its imaginary part multiplied by the imaginary number j. The equation can then be written as:

$$\begin{bmatrix} y_{1R} + j \cdot y_{1I} \\ y_{2R} + j \cdot y_{2I} \\ \vdots \\ y_{N_R R} + j \cdot y_{N_R I} \end{bmatrix} =$$

$$\begin{bmatrix} h_{11R} + j \cdot h_{11I} & h_{12R} + j \cdot h_{12I} & \ldots & h_{1N_T R} + j \cdot h_{1N_T I} \\ h_{21R} + j \cdot h_{21I} & h_{22R} + j \cdot h_{22I} & \ldots & h_{2N_T R} + j \cdot h_{2N_T I} \\ \vdots & \vdots & \ddots & \vdots \\ h_{N_R 1R} + j \cdot h_{N_R 1I} & h_{N_R 2R} + j \cdot h_{N_R 2I} & \ldots & h_{N_R N_T R} + j \cdot h_{N_R N_T I} \end{bmatrix} \times$$

$$\begin{bmatrix} x_{1R} + j \cdot x_{1I} \\ x_{2R} + j \cdot x_{2I} \\ \vdots \\ x_{N_T R} + j \cdot x_{N_T I} \end{bmatrix} + \begin{bmatrix} z_{1R} + j \cdot z_{1I} \\ z_{2R} + j \cdot z_{2I} \\ \vdots \\ z_{N_R R} + j \cdot z_{N_R I} \end{bmatrix}$$

In this equation, we note $x_{iR} = \text{Re}(x_i)$, i.e. the real part of the complex emitted symbol $x_i$; and $x_{iI} = \text{Im}(x_i)$, i.e. the imaginary part of the complex symbol $x_i$. Similarly, we note $y_{iR} = \text{Re}(y_i)$, i.e. the real part of the complex received symbol $y_i$; and $y_{iI} = \text{Im}(y_i)$, i.e. the imaginary part of the complex symbol $y_i$.

Similarly, we can also note $h_{ijR} = \text{Re}(h_{ij})$, and $h_{ijI} = \text{Im}(h_{ij})$, as well as $z_{iR} = \text{Re}(z_i)$, and $z_{iI} = \text{Im}(z_i)$.

Taking the example of a 2×2 MIMO transmission channel TC, this equation becomes as follows:

$$\begin{bmatrix} y_{1R} + j \cdot y_{1I} \\ y_{2R} + j \cdot y_{2I} \end{bmatrix} = \begin{bmatrix} h_{11R} + j \cdot h_{11I} & h_{12R} + j \cdot h_{12I} \\ h_{21R} + j \cdot h_{21I} & h_{22R} + j \cdot h_{22I} \end{bmatrix} \cdot \begin{bmatrix} x_{1R} + j \cdot x_{1I} \\ x_{2R} + j \cdot x_{2I} \end{bmatrix} +$$

$$\begin{bmatrix} z_{1R} + j \cdot z_{1I} \\ z_{2R} + j \cdot z_{2I} \end{bmatrix}$$

The real and imaginary parts for this equation can be respectively expressed as:

$$\begin{bmatrix} y_{1R} \\ y_{2R} \end{bmatrix} = \begin{bmatrix} h_{11R} & h_{12R} \\ h_{21R} & h_{22R} \end{bmatrix} \begin{bmatrix} x_{1R} \\ x_{2R} \end{bmatrix} - \begin{bmatrix} h_{11I} & h_{12I} \\ h_{21I} & h_{22I} \end{bmatrix} \begin{bmatrix} x_{1I} \\ x_{2I} \end{bmatrix} + \begin{bmatrix} z_{1R} \\ z_{2R} \end{bmatrix}$$

$$= \begin{bmatrix} h_{11R} & h_{12R} & -h_{11I} & -h_{12I} \\ h_{21R} & h_{22R} & -h_{21I} & -h_{22I} \end{bmatrix} \begin{bmatrix} x_{1R} \\ x_{2R} \\ x_{1I} \\ x_{2I} \end{bmatrix} + \begin{bmatrix} z_{1R} \\ z_{2R} \end{bmatrix}$$

and $$\begin{bmatrix} y_{1I} \\ y_{2I} \end{bmatrix} = \begin{bmatrix} h_{11I} & h_{12I} & h_{11R} & h_{12R} \\ h_{21I} & h_{22I} & h_{21R} & h_{22R} \end{bmatrix} \begin{bmatrix} x_{1R} \\ x_{2R} \\ x_{1I} \\ x_{2I} \end{bmatrix} + \begin{bmatrix} z_{1I} \\ z_{2I} \end{bmatrix}$$

These two equations can be merged together to form a new one by putting real and imaginary parts in same vectors and matrices $\overline{y}, \overline{H}, \overline{x}, \overline{z}$:

$$\underbrace{\begin{bmatrix} y_{1R} \\ y_{2R} \\ y_{1I} \\ y_{2I} \end{bmatrix}}_{\overline{y}} = \underbrace{\begin{bmatrix} h_{11R} & h_{12R} & -h_{11I} & -h_{12I} \\ h_{21R} & h_{22R} & -h_{21I} & -h_{22I} \\ h_{11I} & h_{12I} & h_{11R} & h_{12R} \\ h_{21I} & h_{22I} & h_{21R} & h_{22R} \end{bmatrix}}_{\overline{H}} \underbrace{\begin{bmatrix} x_{1R} \\ x_{2R} \\ x_{1I} \\ x_{2I} \end{bmatrix}}_{\overline{x}} + \underbrace{\begin{bmatrix} z_{1R} \\ z_{2R} \\ z_{1I} \\ z_{2I} \end{bmatrix}}_{\overline{z}}$$

Then, according to the sphere detection method, the problem to be solved consists in finding solutions of the following solution $$\arg\min_{\overline{x}} \|\overline{y} - \overline{H}\overline{x}\|^2 = \arg\min_{\overline{x}} (\overline{x} - \hat{\overline{x}})^T \overline{H}^T \overline{H} (\overline{x} - \hat{\overline{x}})$$

Using QR decomposition, this equation can also be written:

$$(\overline{x} - \hat{\overline{x}})^T \overline{H}^T \overline{H} (\overline{x} - \hat{\overline{x}}) = (\overline{x} - \hat{\overline{x}})^T R^T R (\overline{x} - \hat{\overline{x}}) = \|R(\overline{x} - \hat{\overline{x}})\|^2$$

wherein $\overline{x}$ represents the searched solution, i.e. the value of the vector x associated with the vector x of emitted symbols to be estimated, and wherein:

$$\|R(\overline{x} - \hat{\overline{x}})\|^2 = \left\| \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \times \begin{bmatrix} \overline{x}_1 - \hat{\overline{x}}_1 \\ \overline{x}_2 - \hat{\overline{x}}_2 \\ \overline{x}_3 - \hat{\overline{x}}_3 \\ \overline{x}_4 - \hat{\overline{x}}_4 \end{bmatrix} \right\|^2$$

According to the definition of $\overline{y}, \overline{H}, \overline{x}, \overline{z}$ given earlier, $$\overline{x}_1 = x_{1R} = Re(x_1)$$

$$\overline{x}_2 = x_{2R} = Re(x_2)$$

$$\overline{x}_3 = x_{1I} = Im(x_1)$$

$$\overline{x}_4 = x_{2I} = Im(x_2)$$

The same equation can be decomposed as:

$$\|R(\overline{x} - \hat{\overline{x}})\|^2 = |r_{44}(\overline{x}_4 - \hat{\overline{x}}_4)|^2 + |r_{33}(\overline{x}_3 - \hat{\overline{x}}_3) + r_{34}(\overline{x}_4 - \hat{\overline{x}}_4)|^2 +$$
$$|r_{22}(\overline{x}_2 - \hat{\overline{x}}_2) + r_{23}(\overline{x}_3 - \hat{\overline{x}}_3) + r_{24}(\overline{x}_4 - \hat{\overline{x}}_4)|^2 +$$
$$|r_{11}(\overline{x}_1 - \hat{\overline{x}}_1) + r_{12}(\overline{x}_2 - \hat{\overline{x}}_2) + r_{13}(\overline{x}_3 - \hat{\overline{x}}_3) + r_{14}(\overline{x}_4 - \hat{\overline{x}}_4)|^2$$

This expression is used by some solutions known in the art under the general name of "sphere decoder" or universal lattice decoding algorithm. It has for instance been described in the article "Maximum Likelihood sequence estimation from the lattice viewpoint" by W. Mow, in IEEE Transactions on Information Theory, vol. 40, no. 5, pp. 1591-1600, in year 1994, the disclosure of which is incorporated by reference.

The principle of the sphere decoding algorithm is to search the closest lattice point to the received vector within a hyper-sphere radius, where each possible vector is represented by a lattice point in a lattice field. It is usually based on the Finke-Pohst enumeration to explore all the lattice points inside the hypersphere centered at the received symbol vector.

This Sphere Decoding (SD) algorithm allows lowering the computational complexity compared with maximum likelihood decoding approaches.

However, the average complexity of the SD algorithm is shown to be polynomial in the number $N_T$ of transmit antennas over a certain range of Signal-to-Noise Ratio (SNR) and number of transmit antennas, while the worst case complexity is still exponential.

According to embodiments, the sphere decoding is not used for finding the estimate for the emitted vector of symbols, but for reducing the set of the possible emitted vectors of symbol wherein the estimate is searched by maximum-likelihood-based decoding methods.

In other words, both sphere decoding and maximum-likelihood-based decoding methods are used together, in such a way that the overall complexity is reduced, whereas each of the approaches, separately, presents complexity issues.

Accordingly a first step can be implemented to use the previous equation for determining a subset among all possible vectors of emitted symbols. This subset will then be used, within a second step, as the space within which an estimate is selected, according to maximum-likelihood-based methods, i.e. as the one which minimizes a given metric, e.g. a Euclidian distance, as it will be exposed below.

In this first step, the subset is defined by finding intervals for each of the symbols of the vector x: instead of being free to take any possible values of the constellation, each symbol will be limited to an interval, so that the size of the search space used during the second step is considerably reduced.

As the values of the symbols are complex values, the intervals should be understood as one interval for the real part and one interval for the imaginary part of each symbol.

The intervals for each symbol of the vector can be determined through an iterative process, wherein the determination of a first interval for a first symbol can allow the determination of a second interval for a second symbol, etc. At the end of the process, intervals for all the symbols are defined.

Referring again to the previous equation, first, candidate values are chosen for $\overline{x}_4 - \hat{\overline{x}}_4$ within the hyper-sphere determined by the radius $R_{SD}$, so that $|r_{44}(\overline{x}_4 - \hat{\overline{x}}_4)|^2 \leq R_{SD}^2$. In other words $\overline{x}_4 - \hat{\overline{x}}_4$ is chosen in the following range:

$$-\frac{R_{SD}}{r_{44}} \leq \overline{x}_4 - \hat{\overline{x}}_4 \leq \frac{R_{SD}}{r_{44}}$$

wherein $R_{SD}$ represents the radius of the hypersphere.

This radius can be given according to the equation:

$$R_{SD} = \left|r_{44}(\overline{x}_4 - \hat{\overline{x}}_4)\right|^2 + \left|r_{33}(\overline{x}_3 - \hat{\overline{x}}_3) + r_{34}(\overline{x}_4 - \hat{\overline{x}}_4)\right|^2 +$$
$$\left|r_{22}(\overline{x}_2 - \hat{\overline{x}}_2) + r_{23}(\overline{x}_3 - \hat{\overline{x}}_3) + r_{24}(\overline{x}_4 - \hat{\overline{x}}_4)\right|^2 +$$
$$\left|r_{11}(\overline{x}_1 - \hat{\overline{x}}_1) + r_{12}(\overline{x}_2 - \hat{\overline{x}}_2) + r_{13}(\overline{x}_3 - \hat{\overline{x}}_3) + r_{14}(\overline{x}_4 - \hat{\overline{x}}_4)\right|^2$$

As the purpose of the usage of the sphere decoding is different, some modification to the algorithm can be done, so as to reduce its complexity while still providing the efficiency required for the aim of this first step.

Figure 2:
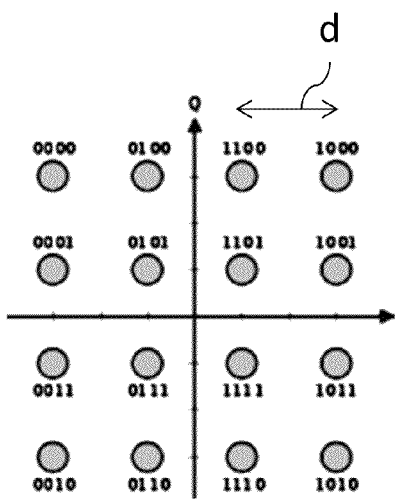
FIG. 2 shows an example for a constellation relating to a 16-QAM modulation scheme.

Accordingly, the error terms, i.e. the differences between evaluated symbols and the estimate, are approximated by a predetermined factor m·d, wherein m and d are two parameters: m representing the complexity and d the constellation distance between consecutive points.

d is simply the minimum vertical (imaginary) or horizontal (real) distance between two neighboring constellation points as depicted in the example of FIG. 2.

m may depend on several factors that determines the receiver performance such as: signal to noise ratio (SNR), channel estimation precision, time recovery precision, frequency synchronization precision, etc.

A high value for m increases the BNR vs. SNR performance, but increases also the LC-QR-MLD algorithm. For this reason a compromise should be found. In practice, the value for m is determined by simulations; many parametric simulations are done to find the minimum value of m necessary to attain the needed "BER vs. SNR" performance.

Replacing the error terms by such a predetermined factor allows dramatically reducing the complexity of the sphere decoding process, while keeping it efficient enough for determining good subsets of candidate vectors of emitted symbols. "Good" subset means here that the subset should be narrow enough to decrease the complexity of the second step, but also the subset should contain the optimal solution.

It has been proved that this embodiment results in a good efficiency, as it will be shown below.

The radius $R_{SD}$ of the hypersphere can then be given by the expression $$R_{SD} = [r_{44}^2 + (r_{33} + r_{34})^2 + (r_{22} + r_{23} + r_{24})^2 + (r_{11} + r_{12} + r_{13} + r_{14})^2] \times (m \times d)^2$$

From this radius $R_{SD}$, a range can be determined for the expression $\overline{x}_4 - \hat{\overline{x}}_4$. This range implicitly defines an interval for the corresponding symbol of the vector of emitted symbols x. In this example, $\overline{x}_4$ corresponds to the imaginary part of the symbol $x_2$ for which, thus, an interval is defined.

Once this interval is defined, the next symbol is considered within the iterative process.

According to this example, candidate values are chosen for $\overline{x}_3 - \hat{\overline{x}}_3$ within the hyper-sphere determined by the radius $R_{SD}$, so that $$|r_{44}(\overline{x}_4 - \hat{\overline{x}}_4)|^2 + |r_{33}(\overline{x}_3 - \hat{\overline{x}}_3) + r_{34}(\overline{x}_4 - \hat{\overline{x}}_4)|^2 \leq R_{SD}^2.$$

Knowing the range within which the values of $\overline{x}_4 - \hat{\overline{x}}_4$ can be, it is straightforward to determine such range for $\overline{x}_3 - \hat{\overline{x}}_3$. This range should be defined so as to be the widest possible (i.e. by using the extreme values of the expression $\overline{x}_4 - \hat{\overline{x}}_4$).

This range implicitly defines an interval for the real part of the symbol $x_2$.

Once this interval is defined, the next symbol is considered within the iterative process.

According to this example, candidate values are chosen for $\overline{x}_2 - \hat{\overline{x}}_2$ within the hyper-sphere determined by the radius $R_{SD}$, so that $$|r_{44}(\overline{x}_4-\hat{\overline{x}}_4)|^2+|r_{33}(\overline{x}_3-\hat{\overline{x}}_3)+r_{34}(\overline{x}_4-\hat{\overline{x}}_4)|^2+|r_{22}(\overline{x}_2-\hat{\overline{x}}_2)+r_{23}(\overline{x}_3-\hat{\overline{x}}_3)+r_{24}(\overline{x}_4-\hat{\overline{x}}_4)|^2 \leq R_{SD}^2$$

Knowing the range within which the values of $\overline{x}_4 - \hat{\overline{x}}_4$ and $\overline{x}_3 - \hat{\overline{x}}_3$ can be, it is straightforward to determine such range for $\overline{x}_2 - \hat{\overline{x}}_2$. This range should be defined so as to be the widest possible (i.e. by using the extreme values of the expressions $\overline{x}_4 - \hat{\overline{x}}_4$ and $\overline{x}_3 - \hat{\overline{x}}_3$).

This range implicitly defines an interval for the imaginary part of the symbol $x_1$.

Once this interval is defined, the next symbol is considered within the iterative process.

According to this example, candidate values are chosen for $\overline{x}_1 - \hat{\overline{x}}_1$ within the hyper-sphere determined by the radius $R_{SD}$, so that $$|r_{44}(\overline{x}_4-\hat{\overline{x}}_4)|^2+|r_{33}(\overline{x}_3-\hat{\overline{x}}_3)+r_{34}(\overline{x}_4-\hat{\overline{x}}_4)|^2+|r_{22}(\overline{x}_2-\hat{\overline{x}}_2)+r_{23}(\overline{x}_3-\hat{\overline{x}}_3)+r_{24}(\overline{x}_4-\hat{\overline{x}}_4)|^2+|r_{11}(\overline{x}_1-\hat{\overline{x}}_1)+r_{12}(\overline{x}_2-\hat{\overline{x}}_2)+r_{13}(\overline{x}_3-\hat{\overline{x}}_3)+r_{14}(\overline{x}_4-\hat{\overline{x}}_4)|^2 \leq R_{SD}^2$$

Knowing the range within which the values of $\overline{x}_4 - \hat{\overline{x}}_4$, $\overline{x}_3 - \hat{\overline{x}}_3$ and $\overline{x}_2 - \hat{\overline{x}}_2$ can be, it is straightforward to determine such range for $\overline{x}_1 - \hat{\overline{x}}_1$. This range should be defined so as to be the widest possible (i.e. by using the extreme values of the expressions $\overline{x}_4 - \hat{\overline{x}}_4$, $\overline{x}_3 - \hat{\overline{x}}_3$ and $\overline{x}_2 - \hat{\overline{x}}_2$).

This range implicitly defines an interval for the real part of the symbol $x_1$.

At the end of this last step, the symbols $x_1$, $x_2$ of the emitted vector x have been limited to intervals, both for their real and imaginary parts. These intervals define subsets C1, C2 for, respectively, the symbols $x_1$ and $x_2$, among all the possible emitted symbols.

The subset of the possible vectors, resulting of these two subsets C1, C2, is dramatically reduced compared with the full range of possibilities, leading to a decreased complexity of the estimation method.

In a second step of the detection method, this subset is used as the space within which an estimate is selected, according to maximum-likelihood-based methods, i.e. as the one which minimizes a given metric.

According to an embodiment, the metric is an Euclidian distance $\|y - H \cdot x\|^2$ associated with a criterion $y - H \cdot x$.

This criterion represents a maximum-likelihood-based criterion for which the minimal solution is sought.

In embodiments, this criterion can be decomposed by a QR decomposition. QR decomposition is a decomposition of a matrix into a product of an orthogonal matrix Q and an upper triangular matrix R. QR decomposition is often used to solve the linear least squares problem and is the basis for a particular eigenvalue algorithm, the QR algorithm.

The metric can then be rewritten as follows:

$$\|y - H \cdot x\| = \|y - Q \cdot R \cdot x\|$$
$$= \|Q^H(y - Q \cdot R \cdot x)\|$$
$$= \|\tilde{y} - R \cdot x\|$$

This QR decomposition is used in the QRM-MLD algorithms (QR decomposition with order M Maximum Likelihood Decoding), like those known in the art and fully described in the literature. In the prior art, the aim is to find the vector x than minimizes this equation, knowing that each symbols of this vector belongs to full set of the constellation's possibilities. In the case of high order QAM constellation (e.g. 64 QAM and above), huge processing is needed to find the best symbols.

The symbols belong to subsets of this full set, as previously defined.

Taking back the previous example of a 2×2 MIMO communication system (wherein $N_T=N_R=2$), the metric expression can be decomposed as:

$$\|y - H \cdot x\|^2 = \left\| \begin{bmatrix} \tilde{y}_1 \\ \tilde{y}_2 \end{bmatrix} - \begin{bmatrix} r_{11} & r_{12} \\ 0 & r_{22} \end{bmatrix} \cdot \begin{bmatrix} x_1 \\ x_2 \end{bmatrix} \right\|$$

$$= |\tilde{y}_2 - r_{22}x_2|^2 + |\tilde{y}_1 - r_{11}x_1 - r_{32}x_2|^2$$

According to embodiments, the aim becomes to find the vector $x = (x_1, x_2)^T$ minimizing this expression, with $x_1 \in C1$ and $x_2 \in C2$. This vector can be considered as the emitted symbol.

Except that the symbols are limited to given subset, this minimization problem can be solved according to the known-in-the art algorithms, like the QRM-MLD algorithm. Since these techniques are well documented and thus easily accessible to the man skilled in the art, they won't be described in details here.

It is considered sufficient to say that the QRM-MLD method is a sort of trial and error method, where M best candidates for a first symbol are determined, as the one which minimizes a first term, and then the other candidates for the other symbols are determined according to the previous determination, until a full vector is determined.

In the example of the 2×2 MIMO system,

First, M candidate symbols $x_2$ are determined, corresponding to the M smallest values of the term $|\tilde{y}_2 - r_{22}x_2|^2$, knowing that $x_2 \in C2$;

Then, M candidate symbols $x_1$ are determined, corresponding to the M smallest values of the expression $|\tilde{y}_2 - r_{22}x_2|^2 + |\tilde{y}_1 - r_{11}x_1 - r_{32}x_2|^2$, knowing that $x_1 \in C1$ and $x_2$ belongs to the M previously determined candidates for $x_2$.

The symbols which are determined form the estimate for the vector of emitted symbols.

Figure 3:
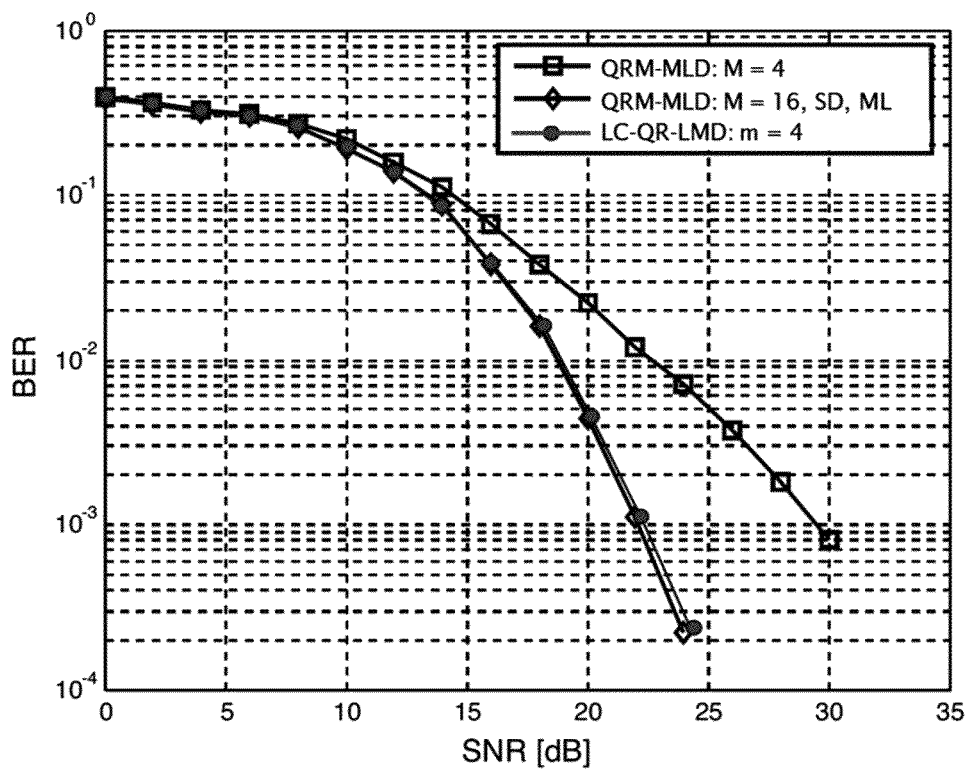
FIG. 3 shows a comparison of the performance of the QRM-MLD method and of the method of an embodiment, called "LC-QR-MLD"

FIG. 3 shows a comparison of the performance of the QRM-MLD method and of the method of the invention, called "LC-QR-MLD" for "Low Complexity QR decomposition based Maximum Likelihood Decoding". It shows BER (Bit Error Rate) versus SNR (Signal to Noise Ratio).

The QRM-MLD performances are depicted for two complexity values, M=4, M=16.

It shows clearly that the performance of the LC-QR-MLD method, even with a low complexity parameter (m=4) is similar to the high-complexity QRM-MLD method, supposed to be optimal. However, high-complexity QRM-MLD method is not easily usable in practice, and decreasing its complexity involves a clear loss in performance (see curve of QRM-MLD, with M=4).

Another embodiment includes determining the subset by replacing some of the symbols of the vector of emitted symbols by an approximation.

For the clarity of the explanation, a 4×4 MIMO system is taken as example ($N_T=N_R=4$).

Accordingly, the metric can be written as:

$$\|y - H \cdot x\|^2 = \left\| \begin{bmatrix} \tilde{y}_1 \\ \tilde{y}_2 \\ \tilde{y}_3 \\ \tilde{y}_4 \end{bmatrix} - \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \cdot \begin{bmatrix} x_1 \\ x_2 \\ x_3 \\ x_4 \end{bmatrix} \right\|$$

$$= |\tilde{y}_4 - r_{44}x_4|^2 + |\tilde{y}_3 - r_{33}x_3 - r_{34}x_4|^2 +$$
$$|\tilde{y}_2 - r_{22}x_2 - r_{23}x_3 - r_{24}x_4|^2 +$$
$$|\tilde{y}_1 - r_{11}x_1 - r_{12}x_2 - r_{13}x_3 - r_{14}x_4|^2$$

In order to find the estimate $\{x_1, x_2, x_3, x_4\}$ for the vector x of emitted symbols, the following equation should be solved:

$$\{x_1, x_2, x_3, x_4\} = \underset{x_1, x_2, x_3, x_4 \in C^4}{\operatorname{argmin}} \left\{ \begin{array}{l} |\tilde{y}_4 - r_{44}x_4|^2 + |\tilde{y}_3 - r_{33}x_3 - r_{34}x_4|^2 + \\ |\tilde{y}_2 - r_{22}x_2 - r_{23}x_3 - r_{24}x_4|^2 + \\ |\tilde{y}_1 - r_{11}x_1 - r_{12}x_2 - r_{13}x_3 - r_{14}x_4|^2 \end{array} \right\}$$

Once again, solving such an equation is a highly complex system, when all the symbols belong to the constellation associated with the modulation scheme and if this modulation scheme is 16 QAM or above.

For example, the symbols $x_1$ and $x_2$ are chosen for being replaced by approximations.

In this previous equation, the terms $|\tilde{y}_2 - r_{22}x_2 - r_{23}x_3 - r_{24}x_4|^2$ and $|\tilde{y}_1 - r_{11}x_1 - r_{12}x_2 - r_{13}x_3 - r_{14}x_4|^2$ are minimized to zero. Due to the orthogonality of the problem formulation, the conditional maximum likelihood decision on the symbols $x_1$ and $x_2$ can be made by a simple threshold test, i.e.:

$$\hat{x}_1(x_3, x_4) = \operatorname{round}\left( \frac{\tilde{y}_1 - r_{11}x_1 - r_{12}x_2 - r_{13}x_3 - r_{14}x_4}{r_{11}} \right)$$

$$\hat{x}_2(x_3, x_4) = \operatorname{round}\left( \frac{\tilde{y}_2 - r_{22}x_2 - r_{23}x_3 - r_{24}x_4}{r_{22}} \right)$$

The "round" operation is a simple slicing operation to the constellation elements. It allows reducing the complexity of the QRM equation by reducing the number of unknowns.

These two expressions can then be reintroduced into the previous equation, so that the final estimate is then given by $$\{\hat{x}_1(x_3, x_4), \hat{x}_2(x_3, x_4), \hat{x}_3, \hat{x}_4\} =$$

$$\underset{x_3, x_4 \in C^2}{\operatorname{argmin}} \left\{ \begin{array}{l} |\tilde{y}_4 - r_{44}x_4|^2 + |\tilde{y}_3 - r_{33}x_3 - r_{34}x_4|^2 + \\ |\tilde{y}_2 - r_{22}x_2(x_3, x_4) - r_{23}x_3 - r_{24}x_4|^2 + \\ |\tilde{y}_1 - r_{11}x_1(x_3, x_4) - r_{12}x_2(x_3, x_4) - r_{13}x_3 - r_{14}x_4|^2 \end{array} \right\}$$

This expression contains only two unknowns $x_3$, $x_4$, instead of 4 in the regular QRM-MLD algorithm. The number of possibilities to be evaluated is then reduced from $C^4$ to $C^2$. The decrease in complexity is therefore significant.

Figure 4:
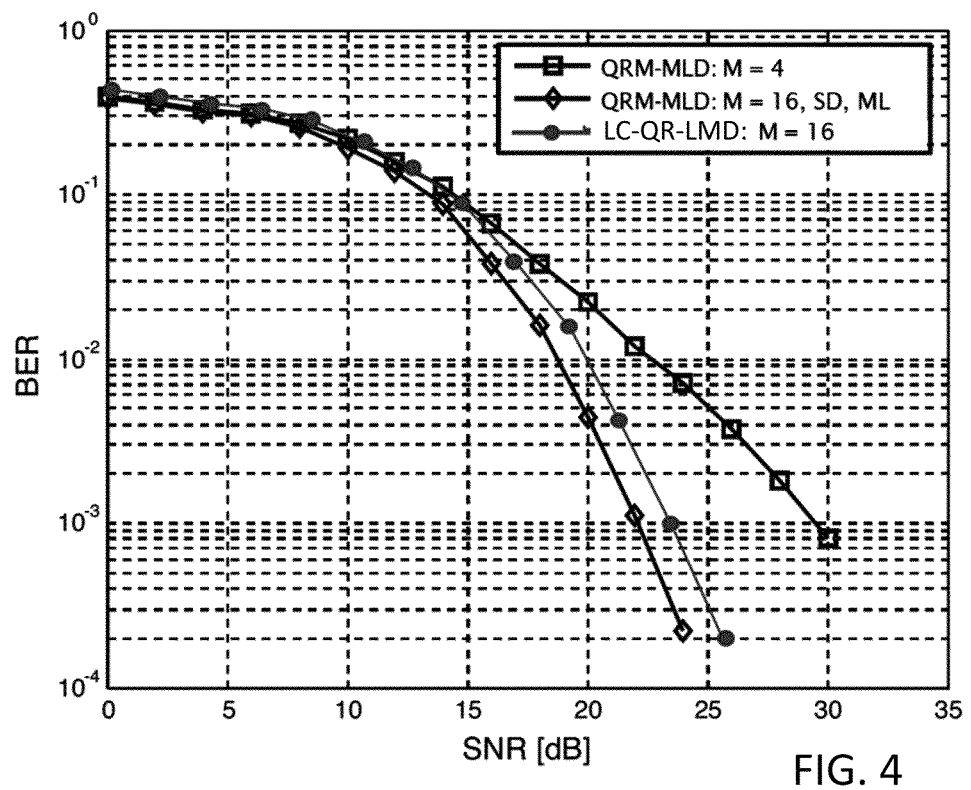
FIG. 4 shows a comparison of the performance of the QRM-MLD method and of the method of another embodiment.

Despite this reduced complexity, the performance of the LC-QR-MLD method according to this embodiment of the invention is comparable to the optimal QRM-MLD as depicted on the FIG. 4.

In a similar way to FIG. 3, FIG. 4 shows in a BER versus SNR diagram, curves corresponding to this embodiment of the LC-QR-MLD method and to the legacy QRM-MLD with two difference complexities: M=4, M=16

It clearly shows also that decreasing the complexity of the QRM-MLD to the same level (M=m=4) than the LC-QR-MLD algorithm dramatically reduces its performance.

A third embodiment comprises avoiding the non-linear nature of the QRM-MLD approaches.

The performance of the linear detection methods known in the art is much lower than the non-linear ones, like the QRM-MLD. However, they have the advantage of being less complex and therefore to require simpler hardware implementations.

It is here proposed to improve the performance without increasing the complexity significantly by a so-called "Ordered Successive Interference Cancellation" (OSIC) method. Such an OSIC method leads to a simple maximum-likelihood verification, with thus similar performances than the non-linear maximum-likelihood methods, without their complexity.

Figure 5:
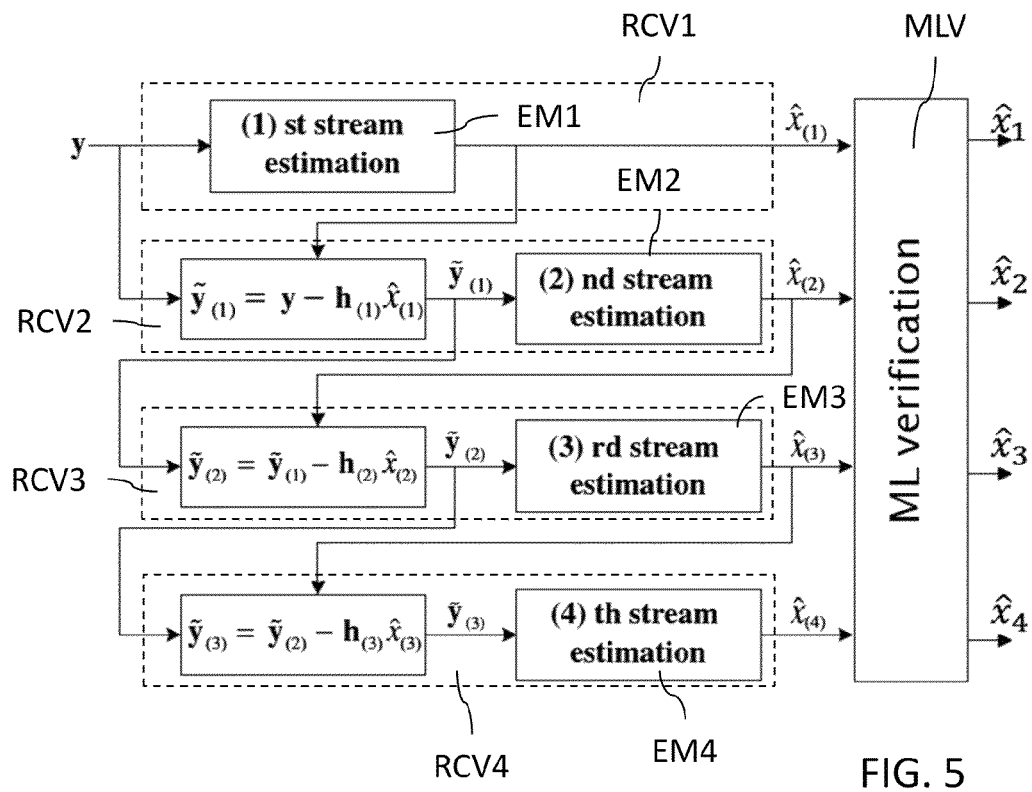
FIG. 5 shows a possible implementation for an OSIC-based receiver RCV, according to an embodiment.

FIG. 5 shows a possible implementation for an OSIC-based receiver RCV. In this example, the emitter has $N_T=4$ antennas, so that the receiver RCV shall determine estimates for 4 emitted symbols, $\hat{x}_1, \hat{x}_2, \hat{x}_3, \hat{x}_4$ The receiver comprises a bank of linear receiving circuits RCV1, RCV2, RCV3, RCV4. Each receiving circuit RCV1, RCV2, RCV3, RCV4 is dedicated to the determination of an estimate symbol, respectively and adapted to determine a subset, respectively $C_1, C_2, C_3, C_4$ for each symbol.

The symbols are estimated in cascade, so that an estimate made by receiving circuit is reintroduced in the next receiving circuit to subtract it from the received signal y. The remaining signal $\tilde{y}_1, \tilde{y}_2, \tilde{y}_3$ with reduced interference can be used then by the subsequent receiving circuits, RCV2, RCV3, RCV4.

Each of the receiving circuits computes a part of the equation, $$y = h_{(1)}\hat{x}_{(1)} + h_{(2)}\hat{x}_{(2)} + h_{(3)}\hat{x}_{(3)} + \ldots + h_{(NT)}\hat{x}_{(NT)} + z$$

wherein $x_{(i)}$ represent the symbol to be detected in the $i^{th}$ order, which may be different from the emitted symbol at the $i^{th}$ antenna since $x_{(i)}$ depends on the order of detection.

A right detection means to have $\hat{x}_{(i)} = x_{(i)}$

The receiving circuits RCV1, RCV2, RCV3, RCV4 comprises estimating means EM1, EM2, EM3, EM4 respectively, which computes the estimates $\hat{x}_{(1)}, \hat{x}_{(2)}, \hat{x}_{(3)}, \hat{x}_{(4)}$. More precisely, the estimating means computes first some raw estimates $\check{x}_{(1)}, \check{x}_{(2)}, \check{x}_{(3)}, \check{x}_{(4)}$ which are then sliced to provide the slices estimates $\hat{x}_{(1)}, \hat{x}_{(2)}, \hat{x}_{(3)}, \hat{x}_{(4)}$. As it will be explained, these sliced estimates form a subset of all the possible emitted symbols. They are then provided to the ML verification module MLV as candidates within which the final estimate $\hat{x}_1, \hat{x}_2, \hat{x}_3, \hat{x}_4$ is selected. This estimate can be selected as previously explained by calculating a metric associated with a criterion. The metric can be an Euclidian distance $\|y - H \cdot x\|^2$ associated with a criterion y−H·x.

The raw estimates $\check{x}_{(1)}, \check{x}_{(2)}, \check{x}_{(3)}, \check{x}_{(4)}$ can be determined according to any linear algorithms, e.g. techniques known in the art like the Zero Forcing (ZF) technique or the MMSE (Minimum Mean Square Error) decoding technique.

Both techniques are well described in the literature, like for instance in "Performance analysis of macrodiversity MIMO systems with MMSE and ZF receivers in flat Rayleigh fading" by D. A. Basnayaka, P. J. Smith and P. A. Martin in IEEE Transactions on Wireless Communications, vol. 12, no. 5, pp. 2240-2251, May 2013, the disclosure of which is incorporated by reference.

Other techniques are also possible as this embodiment is not dependent on any technique, provided this is a linear technique.

In the following explained example, it is supposed that a MMSE decoding technique is used. According to the MMSE decoding technique, a MMSE weight matrix (or Wiener filter):

$$W_{MMSE} = (H^H \cdot H + \sigma_z^2 \cdot I)^{-1} H^H$$

Then, the rows of this matrix can be used separately by the receiving circuits: the first row is used by the receiving circuit RCV1, the second row by the receiving circuit RCV2, etc.

The sliced estimates at the output of an estimating mean EMi are reintroduced as input of the next receiving circuit RCVi+1, so as to compute the input $y_{i+1}$ that is provided to the estimating mean EMi+1:

$$\tilde{y}_{(i+1)} = \tilde{y}_{(i)} - h_{(i+1)} \cdot \hat{x}_{(i+1)}$$

At any estimation mean EMi, if $\hat{x}_{(i)} = x_{(i)}$, then the interference is successfully cancelled in the course of estimating $x_{(i+1)}$. However, if $\hat{x}_{(i)} \neq x_{(i)}$ then error propagation is incurred because the MMSE weight that has been designed under the condition of $\hat{x}_{(i)} = x_{(i)}$ is used to estimate $x_{(i+1)}$.

To avoid this possibility that impairs the decoding processing, this embodiment of the invention can consider not only the sliced estimate $\hat{x}_{(i)}$ but also the neighbors of the raw estimate (non-sliced) $\check{x}_{(i)}$.

FIGS. 6A, 6B, 6C, 6D show the constellation diagram associated with a QAM 256 modulation scheme, with the successive determination of subsets C1, C2, C3, C4 corresponding the successive receiving circuits RCV1, RCV2, RCV3, RCV4.

Figure 6A:
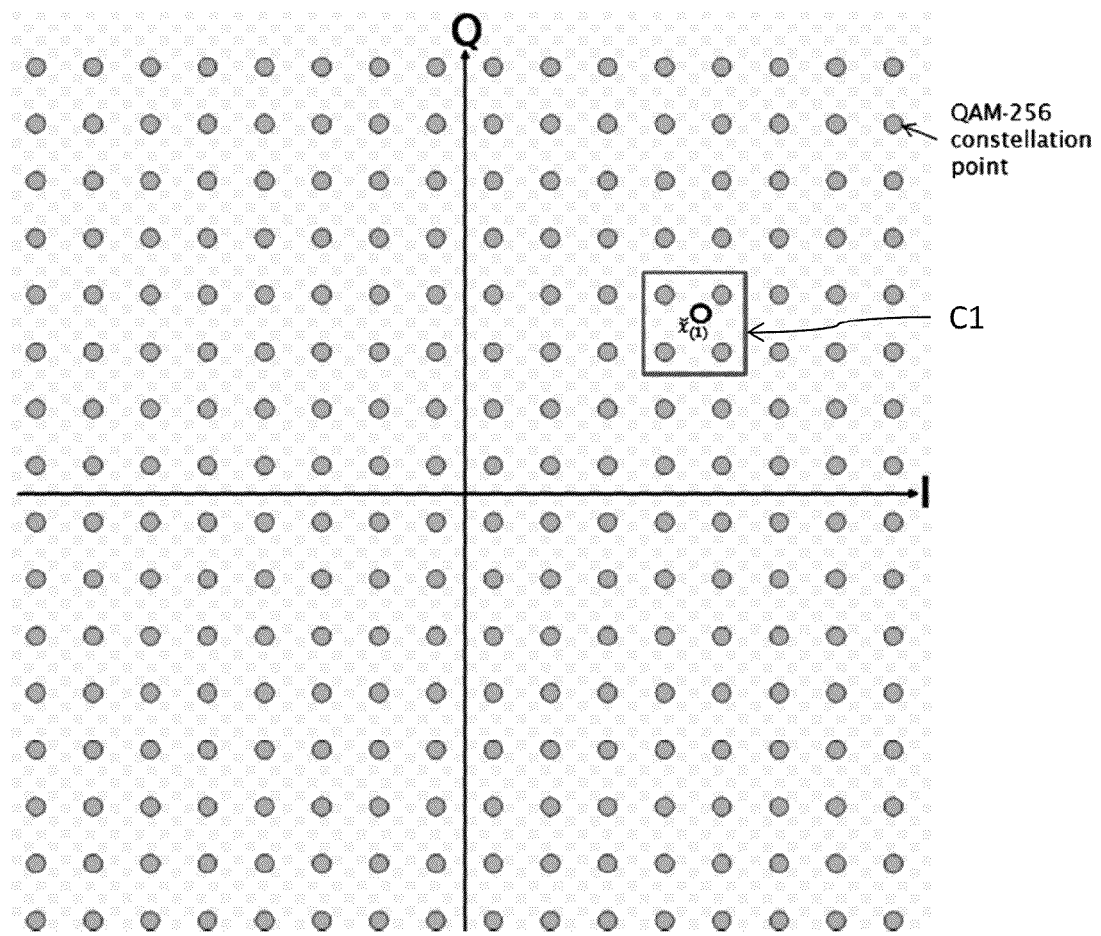
FIGS. 6A, 6B, 6C, 6D shows constellation diagram on which are depicted steps of determination of a subset of possible vector of emitted symbols according to an embodiment.

In FIG. 6A, the subset C1 is depicted as a square around the raw estimate $\check{x}_{(1)}$. This subset comprises several possible estimates $\hat{x}_{(1)}$. The subset C1 can be determined as the minimal set of constellation points surrounding the raw estimate. In the example, there are 4 possible estimates $\hat{x}_{(1)1}, \hat{x}_{(1)2}, \hat{x}_{(1)3}, \hat{x}_{(1)4}$ These 4 direct neighbors are provided to the next receiving circuit RCV2. Each possible neighbor serves as basis for determining estimates $\check{x}_{(2)1}, \check{x}_{(2)2}, \check{x}_{(2)3}, \check{x}_{(2)4}$ for the second symbol $x_{(2)}$.

Figure 6B:
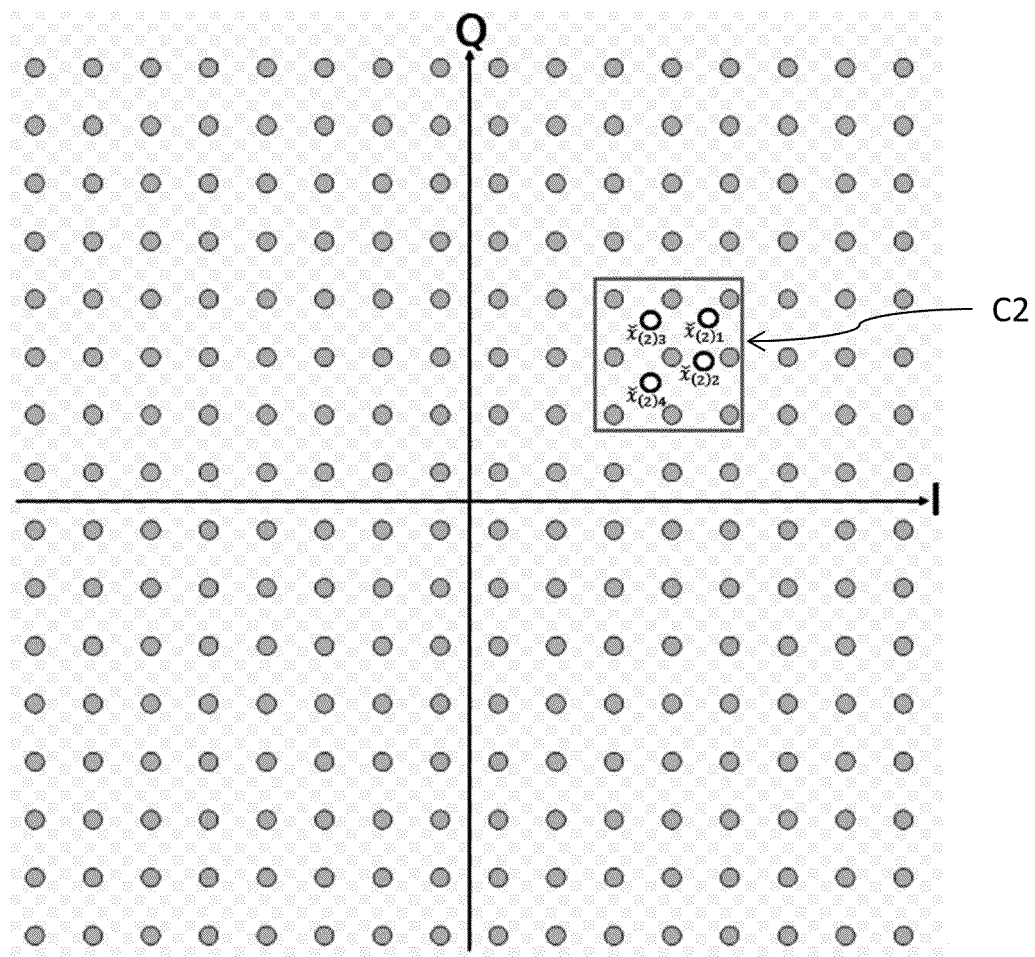

FIG. 6B shows these estimates on the constellation diagram. On the basis of these estimates, a subset C2 is determined as the constellation points which are direct neighbors of $\check{x}_{(2)1}, \check{x}_{(2)2}, \check{x}_{(2)3}, \check{x}_{(2)4}$. Consequently, in this example, 9 direct neighbors are determined within C2, $\hat{x}_{(3)1}, \hat{x}_{(3)2}, \hat{x}_{(3)3}, \hat{x}_{(3)4}, \hat{x}_{(3)5}, \hat{x}_{(3)6}, \hat{x}_{(3)7}, \hat{x}_{(3)8}, \hat{x}_{(3)9}$.

These 9 direct neighbors are provided to the next receiving circuit RCV3. Each possible neighbor serves as basis for determining estimates $\check{x}_{(3)1}, \check{x}_{(3)2}, \check{x}_{(3)3}, \check{x}_{(3)4}, \check{x}_{(3)5}, \check{x}_{(3)6}, \check{x}_{(3)7}, \check{x}_{(3)8}, \check{x}_{(3)9}$ for the third symbol $x_{(3)}$.

Figure 6C:
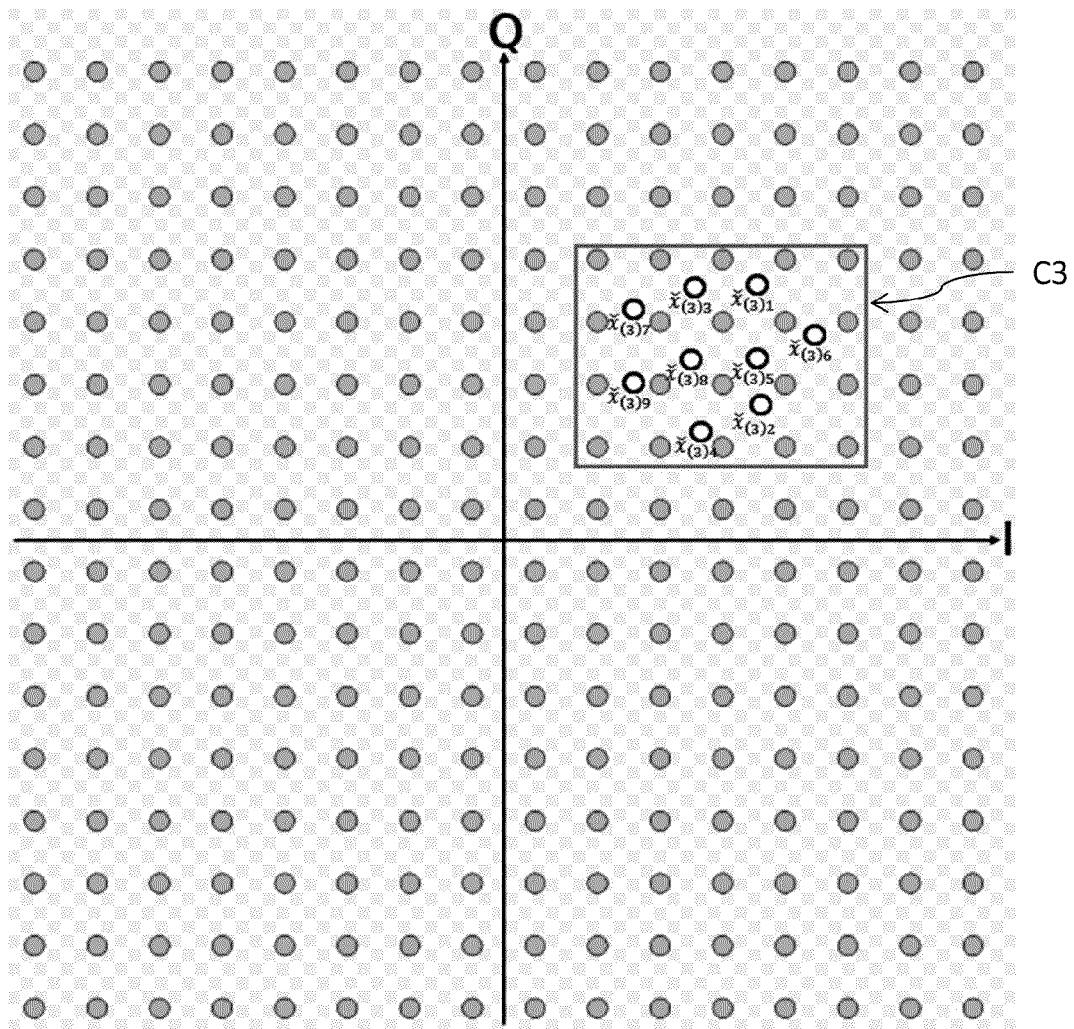

FIG. 6C shows these estimates on the constellation diagram. On the basis of these estimates, a subset C3 is determined as the constellation points which are direct neighbors of $\check{x}_{(3)1}, \check{x}_{(3)2}, \check{x}_{(3)3}, \check{x}_{(3)4}, \check{x}_{(3)5}, \check{x}_{(3)6}, \check{x}_{(3)7}, \check{x}_{(3)8}, \check{x}_{(3)9}$. Consequently, in this example, 20 direct neighbors are determined within C3, $\hat{x}_{(4)1}, \hat{x}_{(4)2}, \hat{x}_{(4)3}, \hat{x}_{(4)4}, \hat{x}_{(4)5}, \hat{x}_{(4)6}, \hat{x}_{(4)7}, \hat{x}_{(4)8} \ldots \hat{x}_{(4)20}$.

These 20 direct neighbors are provided to the next receiving circuit RCV4. Each possible neighbor serves as basis for determining estimates $\check{x}_{(4)1}, \check{x}_{(4)2}, \check{x}_{(4)3}, \check{x}_{(4)4}, \check{x}_{(4)5}, \check{x}_{(4)6}, \check{x}_{(4)7}, \check{x}_{(4)8} \ldots \check{x}_{(4)20}$ for the fourth symbol $x_{(4)}$.

Figure 6D:
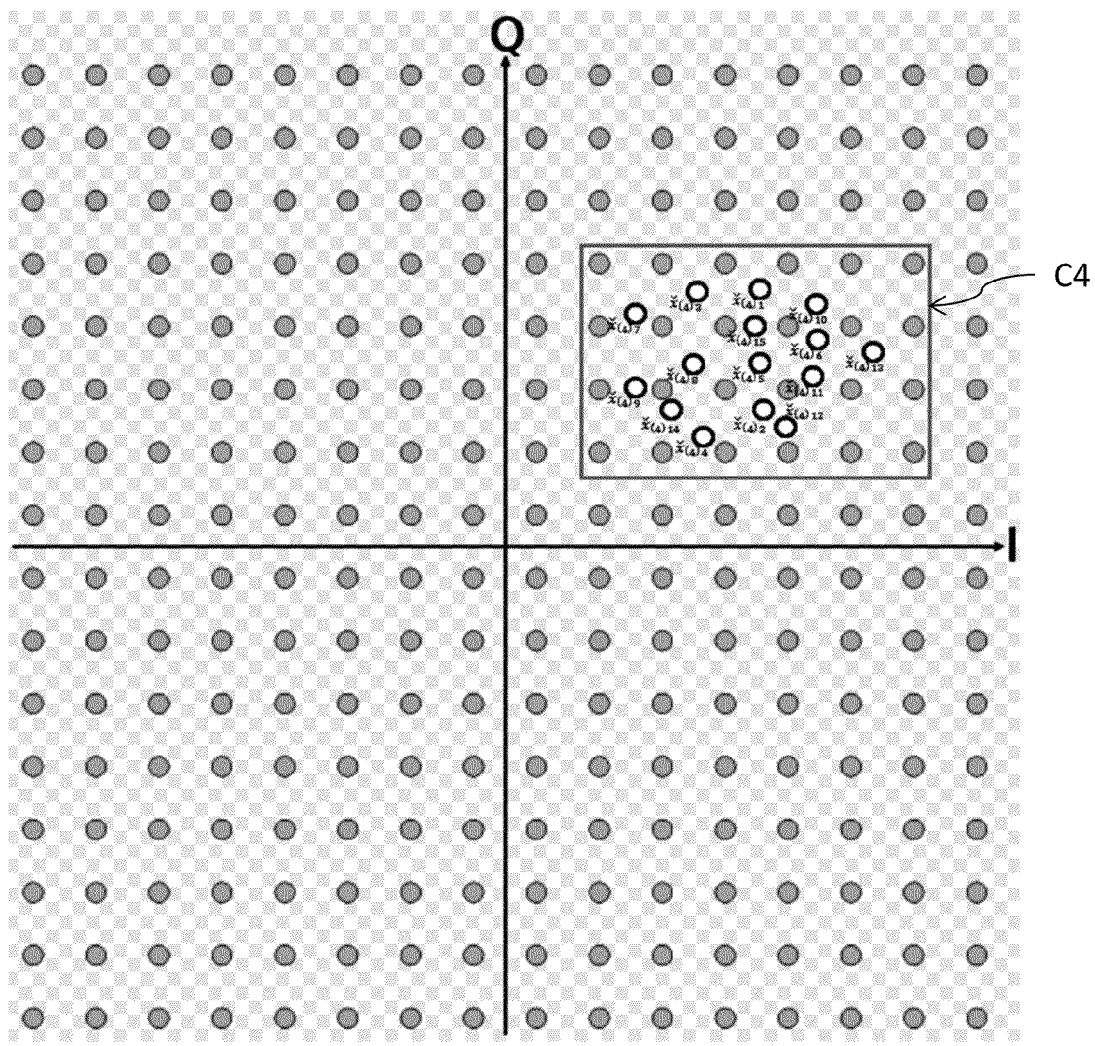

FIG. 6D shows these estimates on the constellation diagram. On the basis of these estimates, a subset C4 is determined as the constellation points which are direct neighbors of $\check{x}_{(4)1}, \check{x}_{(4)2}, \check{x}_{(4)3}, \check{x}_{(4)4}, \check{x}_{(4)5}, \check{x}_{(4)6}, \check{x}_{(4)7}, \check{x}_{(4)8} \ldots \check{x}_{(4)20}$.

Consequently, in this example, 25 direct neighbors are determined within C4.

Consequently, 4 constellations C1, C2, C3, C4 have been defined, which define a subset of all the possibilities of the vectors x of emitted symbols. Each constellation comprises a much more reduced alphabet than the original alphabet (here 256 for a QAM-256 modulation scheme).

Then, the ML verification module MLV takes this subset as input to select a final estimate $\hat{x}_{ML}$ for the vector x.

$$\hat{x}_{ML} = \underset{\hat{x}_1 \in C_1, \hat{x}_2 \in C_2, \hat{x}_3 \in C_3, \hat{x}_4 \in C_4}{\operatorname{argmin}} \|y - H \cdot \hat{x}\|^2$$

This embodiment allows decreasing the complexity of the ML-based solutions, by taking benefit of a reducing of the possible vectors x to consider through linear estimation methods. However this solution has dramatically better performance than the linear methods.

Figure 7:
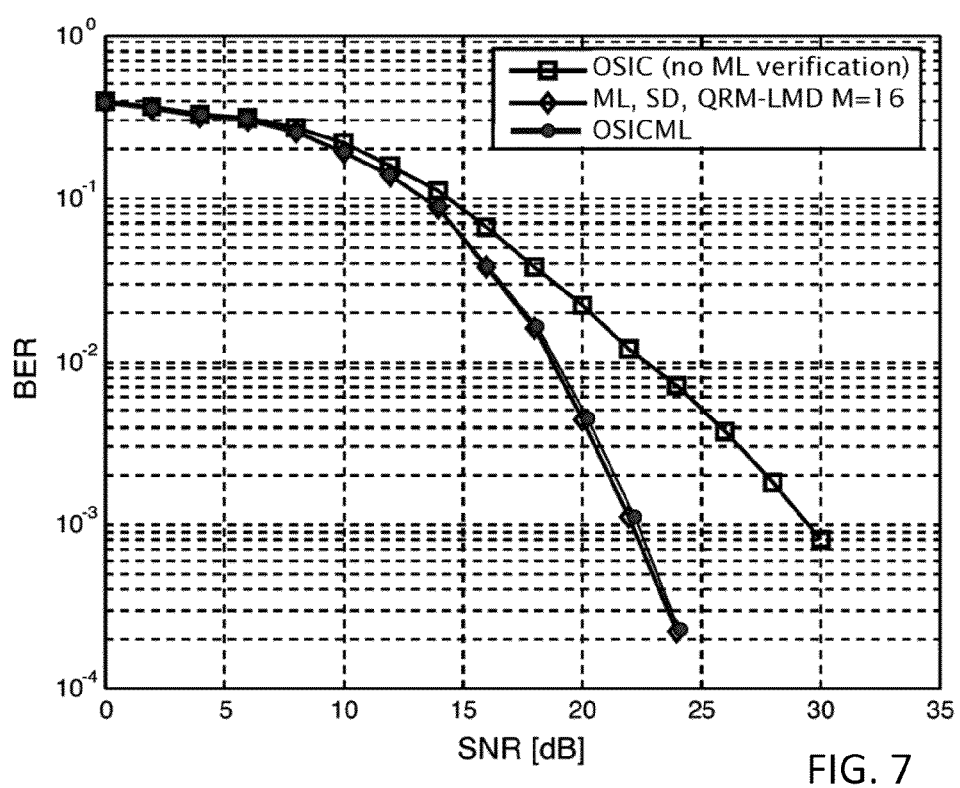
FIG. 7 shows a comparison of the performance of the QRM-MLD method and of the method according to an embodiment called "OSIC".

FIG. 7 shows a comparison of the performance of the QRM-MLD method and of the method of the invention, called "OSIC". It shows BER (Bit Error Rate) versus SNR (Signal to Noise Ratio).

The QRM-MLD performances are depicted for a high complexity value, M=16. The OSIC method is shown with (OSICML) the ML step implemented by the ML verification module MLV, and without this ML verification.

It shows clearly that the performance of the OSIC method is similar to the high-complexity QRM-MLD method, supposed to be optimal. Due to the linearity of the method (except the ML verification step), the complexity is far lower and the ML verification step is performed on a limited constellation so that the overall complexity is still far lower.

The invention has been described with reference to preferred embodiments. However, many variations are possible within the scope of the invention.

What is claimed is:

1. A method for estimating a vector of emitted symbols over a MIMO transmission channel emitted by a first plurality of emitting antennas, comprising:
   receiving a vector of received symbols on a second plurality of receiving antennas; and
   estimating said vector of emitted symbols by:
      determining a subset of all possible vectors of emitted symbols by defining intervals for each symbol of the vector of emitted symbols;
      wherein the intervals for each symbol of the vector of emitted symbols are defined by performing a sphere decoding process that replaces an unknown difference between symbols of the vector of emitted symbols to be evaluated and symbols of the vector of emitted symbols to be estimated with a predetermined factor;
      calculating a metric associated with a criterion for each vector of the subset of all possible vectors of emitted symbols; and
      selecting an estimation for said vector of emitted symbol as the vector of emitted symbols among said subset which minimizes said metric.

2. The method according to claim 1, wherein said metric is an Euclidian distance $\|y-H\cdot x\|^2$ associated with a criterion y−H·x, wherein y represents said vector of received symbols, x represents said each vector, and H represents a transfer function matrix for said transmission channel.

3. The method according to claim 2, wherein selecting the estimation comprises performing a QR decomposition of said criterion.

4. The method according to claim 1, wherein said emitted symbols are modulated by a QAM 16 modulation scheme.

5. The method according to claim 1, wherein the method is implemented as a computer program comprising program instructions stored in a memory, said program instructions being loadable into and executed by a data processing unit.

6. A receiver adapted for estimating a vector of emitted symbols over a MIMO transmission channel emitted by a first plurality of emitting antennas, comprising:
   a receiving circuit configured to receive a vector of received symbols on a second plurality of receiving antennas; and
   a processing circuit configured to
      determine a subset of all possible vectors of emitted symbols by defining intervals for each symbol of the vector of emitted symbols,
      wherein the intervals for each symbol of the vector emitted symbols are defined by using a sphere decoding process including replacing an unknown difference between symbols of the vector of emitted symbols to be evaluated and symbols of the vector of emitted symbols to be estimated with a predetermined factor, and
      estimate said vector of emitted symbols by calculating a metric associated with a criterion for each vector of the subset of all possible vectors of emitted symbols and selecting an estimation for said vector of emitted symbol as the vector of emitted symbols among said subset which minimizes said metric.

7. The receiver according to claim 6, wherein said metric is an Euclidian distance $\|y-H\cdot x\|^2$ associated with a criterion y−H·x, wherein y represents said vector of received symbols, x represents said each vector, and H represents a transfer function matrix for said transmission channel.

8. The receiver according to claim 7, wherein said processing circuit selects the estimation by performing a QR decomposition of said criterion.

* * * * *

UNITED STATES PATENT AND TRADEMARK OFFICE
CERTIFICATE OF CORRECTION

| | |
|---|---|
| PATENT NO. | : 9,209,935 B2 |
| APPLICATION NO. | : 14/337406 |
| DATED | : December 8, 2015 |
| INVENTOR(S) | : Dhayni et al. |

It is certified that error appears in the above-identified patent and that said Letters Patent is hereby corrected as shown below:

In the Specification:

Column 2, line 58, replace [symbols] with -- symbol --.

Signed and Sealed this
Twenty-ninth Day of March, 2016

Michelle K. Lee
*Director of the United States Patent and Trademark Office*